United States Patent
Kuisma

(10) Patent No.: US 6,752,521 B2
(45) Date of Patent: Jun. 22, 2004

(54) LIGHTING ARRANGEMENT FOR PUBLIC TRANSPORT VEHICLES

(75) Inventor: Jouko Kuisma, Lahti (FI)

(73) Assignee: Teknoware Oy, Lahti (FI)

(*) Notice: Subject to any disclaimer, the term of this patent is extended or adjusted under 35 U.S.C. 154(b) by 0 days.

(21) Appl. No.: 10/214,249

(22) Filed: Aug. 7, 2002

(65) Prior Publication Data

US 2003/0031021 A1 Feb. 13, 2003

(30) Foreign Application Priority Data

Aug. 7, 2001 (FI) .............................................. 20011609

(51) Int. Cl.$^7$ ................................................. B60Q 3/00
(52) U.S. Cl. ........................ 362/484; 362/478; 362/488
(58) Field of Search ............................... 362/478, 479, 362/481, 483, 184, 487, 488, 490, 493, 512, 543, 282, 322

(56) References Cited

U.S. PATENT DOCUMENTS

| | | | |
|---|---|---|---|
| 2,582,738 A | * | 1/1952 | Arenberg .................... 362/483 |
| 2,595,858 A | * | 5/1952 | Kuhler ....................... 362/484 |
| 2,779,862 A | | 1/1957 | Eichner |
| 2,779,864 A | * | 1/1957 | Eichner ...................... 362/484 |
| 2,783,365 A | * | 2/1957 | Wilfert ....................... 362/490 |
| 3,358,134 A | * | 12/1967 | Gonyea ...................... 362/484 |
| 4,157,584 A | | 6/1979 | Bhatt |
| 5,347,434 A | | 9/1994 | Drake |
| 5,422,794 A | | 6/1995 | Drake |
| 5,779,228 A | | 7/1998 | Hansen |

* cited by examiner

Primary Examiner—Y My Quach Lee
(74) Attorney, Agent, or Firm—Leydig, Voit & Mayer, Ltd.

(57) ABSTRACT

A lighting arrangement for public transport vehicles comprising a light source and a reflective surface for reflecting light emitted from the light source to a passenger cabin in a public transport vehicle, whereby the upper part of the passenger cabin in the public transport vehicle substantially comprises an upper structure arranged above the seats of the passenger cabin, the structure comprises one or more handrails in the passenger cabin, and the light source is arranged inside the handrail of the upper structure in the public transport vehicle, and the handrail comprises one or more light-permeable apertures, and the handrail apertures are arranged to direct the light generated from the light source to the upper structure of the passenger cabin in the public transport vehicle, the upper structure being arranged to function as the reflective surface for providing the passenger cabin with indirect lighting.

18 Claims, 4 Drawing Sheets

LIGHTING ARRANGEMENT FOR PUBLIC TRANSPORT VEHICLES

BACKGROUND OF THE INVENTION

The invention relates to a lighting arrangement for public transport vehicles comprising a light source and a reflective surface for reflecting light emitted from the light source to a passenger cabin in a public transport vehicle, whereby the upper part of the passenger cabin in the public transport vehicle substantially comprises an upper structure arranged above the seats in the passenger cabin, the structure comprises one or more handrails in the passenger cabin.

Public transport vehicles, such as buses, minibuses, trams and trains, are typically illuminated using lighting fixtures attached to a ceiling structure of the vehicle. The lighting fixtures may for instance be implemented using fluorescent lamps, whereby the lighting fixtures should be fastened to the ceiling structure reliably and at the same time in a manner causing expenses owing to the large size of the lighting fixtures.

The lighting can be implemented either as direct lighting or indirect lighting. An advantage with direct lighting is a high luminous efficiency, and such lighting is typically used in places where high illuminance is required. A drawback with direct lighting is that it may cause a discomfort glare to some seats, as the lighting fixture glares straight at the passenger's eyes.

Particularly on long journeys in such vehicles, the lighting should be a comfortable general lighting that does not directly cause a discomfort glare to the passengers' eyes. Hence, the general lighting is often implemented as indirect lighting where the light sources are encased into a ceiling structure in such a manner that light is reflected from a case structure back towards the ceiling, and then from the ceiling as the general lighting of the passenger cabin. Particularly in such a case, the structure of the lighting fixture becomes complicated and expensive, as the casing should be carried out reliably, and the structure should harmoniously be fitted with the interior design of the vehicle.

In order to make it easier for the passengers to move, public transport vehicles are generally provided with handrails, which the passengers may take hold of to obtain support or to improve their balance. Handrails are generally made of a metal bar, the diameter of which allows the passengers to grip the bar and to use it as a hand hold. The handrails are placed in the vehicles approximately at shoulder or head level of an average built passenger when the passenger is standing in the aisle of the vehicle. The handrails are thus placed above the seats in the vehicle, for instance in a bus or a train.

Handrails may also be placed elsewhere in the vehicle. Such places may include the stairs at the exits of the vehicles as well as other locations where the handrail can be placed approximately at waist level without causing any inconvenience for the passengers while sitting down.

Patent publication U.S. Pat. No. 5,779,228 discloses a solution, where the lighting fixture is placed in a longitudinal cavity formed at the side of the handrail in the vehicle. The lighting fixture is then placed on the outer surface of the handrail and is used for illuminating both the handrail and the vehicle.

Patent publication U.S. Pat. No. 5,347,434 shows an illuminated bag-rack to be mounted on aircrafts. The publication discloses how an electroluminescent lamp implemented as an electroluminescent panel is placed at the edge of the bag-rack side of the handrail placed close to the bag-rack. Such a panel is intended to illuminate the signs placed at the edge of the luggage rack.

BRIEF DESCRIPTION OF THE INVENTION

It is an object of the present invention to provide an arrangement that avoids the above drawbacks and allows implementing the general lighting in a vehicle in a simpler and more economical way than previously available. This object is achieved with the arrangement of the invention, characterized in that the light source is arranged inside the handrail of the upper structure in the public transport vehicle, and that the handrail comprises one or more light-permeable apertures, and that the handrail apertures are arranged to direct the light generated from the light source to the upper structure of the passenger cabin in the public transport vehicle, the upper structure being arranged to function as the reflective surface for providing the passenger cabin with indirect lighting.

The invention is based on the idea that the handrails in public transport vehicles can be utilized for positioning the light source in such a manner that the light source provides the passenger cabin of the vehicle with indirect lighting using already existing structures in the passenger cabin as the reflective surface.

The arrangement of the invention enables reducing the amount of equipment to be mounted to the passenger cabin, and no separate lighting units need to be fastened to the ceiling structure. Since the handrails must naturally be of strong design in order to serve as a support, the light sources can reliably be placed inside the handrails.

BRIEF DESCRIPTION OF THE DRAWINGS

In the following the invention will be described in greater detail by means of the preferred embodiments with reference to the accompanying drawings, in which.

DETAILED DESCRIPTION OF THE INVENTION

Figure 1A:
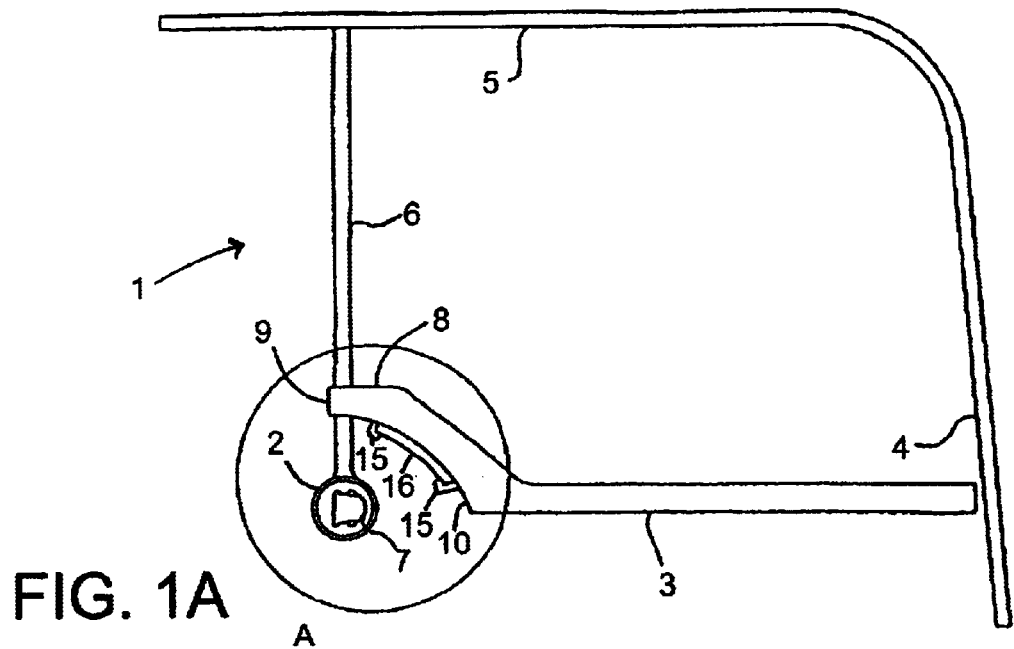
FIGS. 1A, 1B, 2A, 2B, 3A and 3B illustrate embodiments of an arrangement of the invention.
Figure 1B:
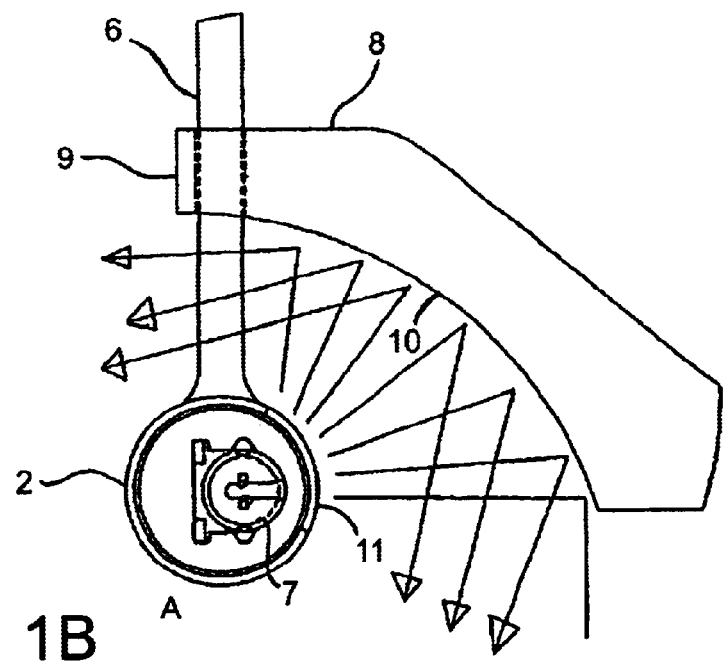

FIGS. 1A and 1B show an embodiment of an arrangement of the invention. The Figures illustrate the cross section of an upper structure 1 in a bus, for instance, where the upper structure comprises a handrail 2 and a luggage rack 3. FIG. 1B shows a portion referred to by letter A of the assembly shown in FIG. 1A that shows the fastening of the luggage rack 3 to an interior wall 4 of the bus, and a vertical bar 6 fastening the handrail 2 and the luggage rack 3 to a ceiling structure 5 in the passenger cabin.

In accordance with FIGS. 1A and 1B the handrail 2 in the passenger cabin of the bus is placed in the vicinity of the luggage rack 3. In the embodiment, the handrail 2 is placed in such a manner that it is substantially located at the same height as the luggage rack 3. In public transport vehicles the luggage rack is typically placed above the seats in the passenger cabin. The handrails 2 thus form such an object that the passengers standing in the passenger cabin can take hold of. In general, the handrails in the passenger cabin vertically extend the entire length of the passenger cabin in the vehicle.

The lighting fixture arrangement of the invention comprises a light source 7 placed inside the handrail 2 in the passenger cabin. The handrail also comprises one or more apertures, shown in a representative position 11, from which the light generated from the light source inside the handrail can be emitted. The apertures formed in the handrail are directed in such a manner that the light hits the upper structure 1 of the passenger cabin in the vicinity of the handrail, the upper structure being arranged to function as a reflective surface for providing the passenger cabin with indirect lighting.

The light-permeable apertures 11 in the handrail are formed, for instance, in such a manner that the metal handrail is provided with apertures of required width, which are further covered with light-permeable plastic or other corresponding material. Thus, no sharp edges are formed in the handrail that may be unpleasant when taking hold of the handrail.

In accordance with a preferred embodiment of the invention, the upper structure 1 of the passenger cabin comprises a luggage rack 3 including an open edge 8. What the open edge 8 of the luggage rack refers to in this context is the edge of the luggage rack, from which luggage can be lifted onto the rack. The open edge is thus the edge of the luggage rack that is located towards the middle of the passenger cabin in the vehicle. However, this open edge can be provided for instance with hinged lids, in which case the bags and belongings on the rack are reliably kept in position.

Also according to a preferred embodiment of the invention the handrail 2 is arranged in the vicinity of the open edge of the luggage rack and substantially below an end 9 of the open edge. A lower surface 10 of the open edge is then arranged as a reflective surface in order to provide the passenger cabin with indirect lighting.

Figure 2A:
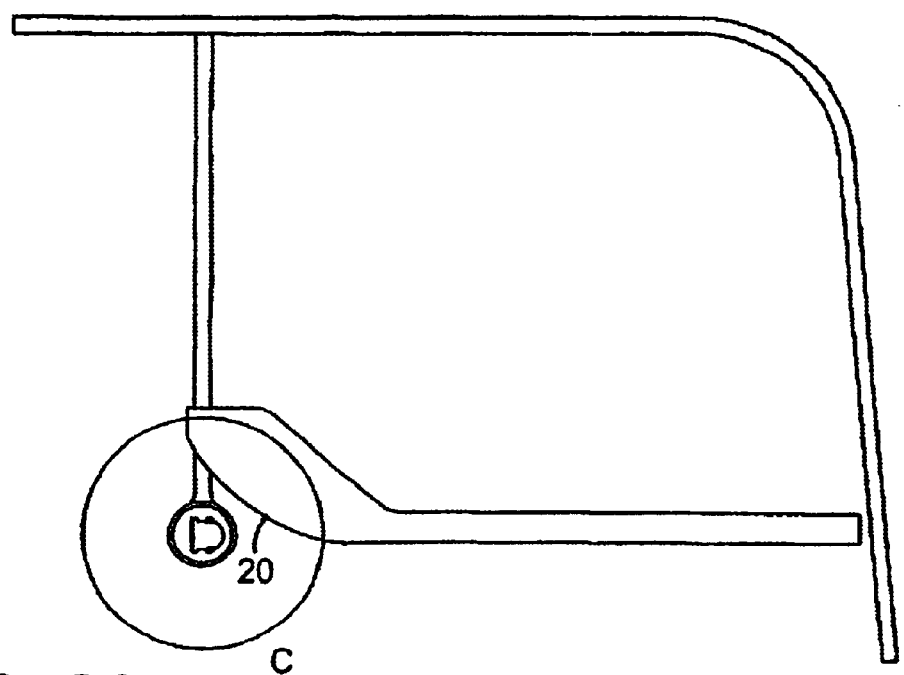
Figure 2B:
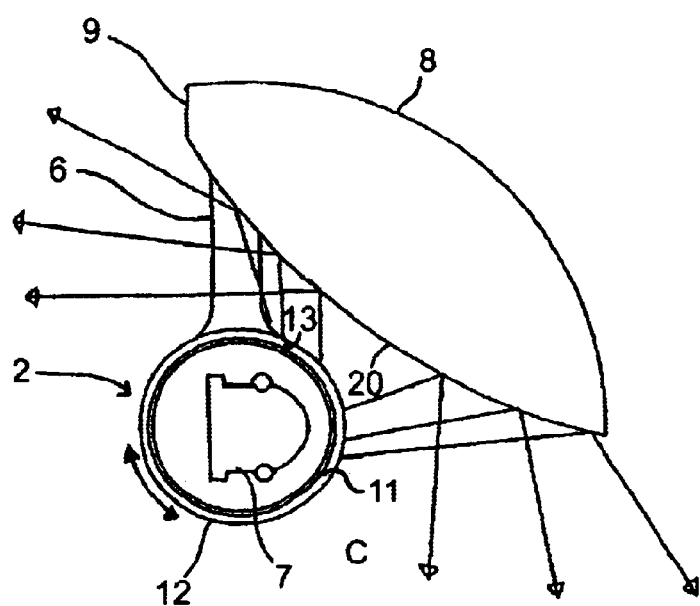

In the embodiment shown in FIGS. 1A and 1B, the cross section of the lower surface 10 of the open edge in the luggage rack is made concave. In the preferred embodiment shown in FIGS. 2A and 2B the cross section of a corresponding lower surface 20 is made convex. In other respects the embodiments illustrated in FIGS. 1 and 2 are similar. The shape of the lower surfaces functioning as reflective surfaces provides differences on how light is distributed in the passenger cabin. A convex surface spreads light to a wider area in the horizontal direction than a concave surface. The cross section of the reflective surface may be arbitrarily selected without having an effect on the scope of the invention.

The light source 7 to be positioned inside the handrail 2 is preferably a fluorescent lamp. Among the commercially available fluorescent lamps the most appropriate for this purpose is, for example, the T5-type fluorescent lamp having a small diameter. Thus, electrical and mechanical connections required by the fluorescent lamp should be arranged inside the tubular handrail, as well as wiring for supplying energy to the fluorescent lamps. An actuator supplying energy may be freely placed in a vehicle.

Figure 3A:
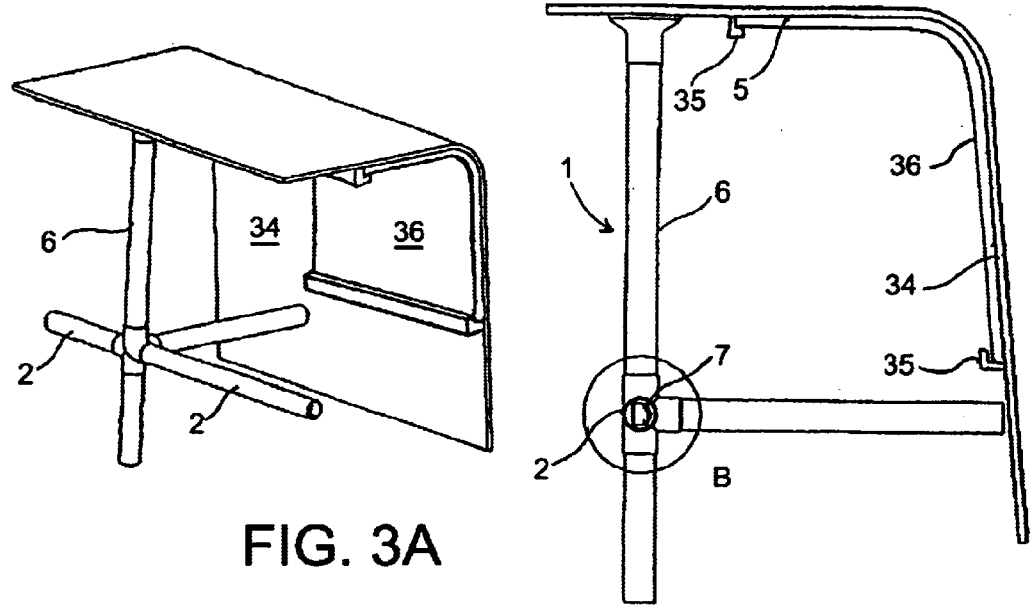
Figure 3B:
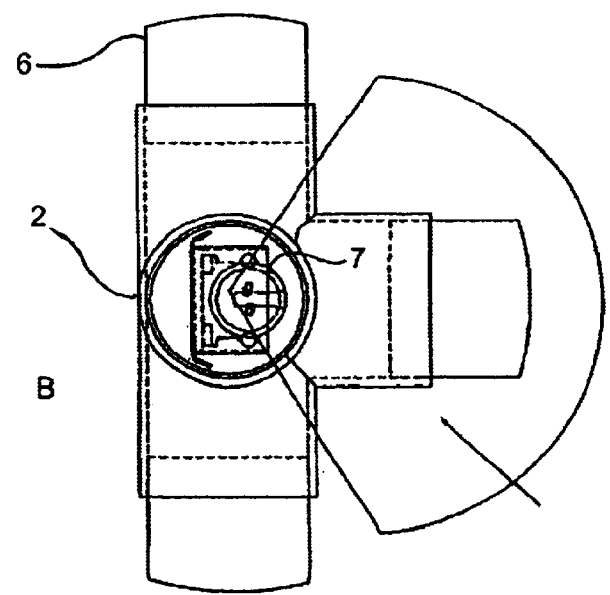

FIGS. 3A and 3B show an embodiment of the invention. In this embodiment the upper structure of the passenger cabin is not provided with a luggage rack, whereby a portion of a wall 34 in the passenger cabin forms the reflective surface for providing the passenger cabin with indirect lighting. This type of solution is practical in such passenger cabins that do not include seats on one or both sides of the passenger cabin. Such a passenger cabin or portion of such a passenger cabin may for instance be an entry hall in trains or trams.

In the embodiments shown in FIGS. 1 and 2, the light from the light source inside the handrail is arranged to be emitted substantially upwards from the horizontal plane. The light is directed by directing the apertures in the handrail. In general, light is directed towards the reflective surface in order to achieve indirect lighting, and the light is not allowed to be directed directly to other surfaces in order to prevent glare. FIGS. 1 and 2 show how the handrail 2 is placed in the vicinity of the luggage rack 3 in such a manner that the reflective surface 10 is disposed around the handrail along an approximately 90 degree angle. The handrail may also be provided with several apertures in order to direct a particularly accurate indirect lighting. In accordance with an embodiment of the invention, the handrail aperture is formed such that a light source is emitted outside the handrail substantially at a 90 degree angle. According to another embodiment of the invention the handrail 2 aperture is arranged so that the light source 7 emits light outside the handrail substantially upwards from the horizontal plane as is shown in FIGS. 1 and 2.

The choice of the material of the reflective surface 10, 20 may considerably affect the quality of the indirect lighting. The choice of such a material may have an effect, for instance, on the brightness and tone of the light to be generated. The material can be selected to suit the interior design of the passenger cabin. The material used may for instance be composed of different types of cloth or plastic, whose surface material and color affect the amount and quality of the light.

According to an embodiment of the invention the apertures 11 in the handrail 2 are adjustable. The apertures 11, 13 of the handrail 2 can be adjusted for instance in such a manner that the surface part 12 of the handrail 2 can be turned around the handrail (FIG. 2B). The apertures 13 provided in the surface part 12 thus move in relation to the apertures 11 in the handrail, and the amount of light can therefore be changed. The adjustable apertures can also be implemented in such a manner that the handrail can be turned. Consequently, the direction can be adjusted to which the light can be emitted from the apertures of the handrail. The adjustment is preferably implemented so that the handrail or the surface part thereof can be locked in position, whereby the lighting cannot accidentally be adjusted when the handrail is gripped.

In accordance with an embodiment of the invention, the reflective surface comprises a mounting bracket 15, 35 for mounting advertisements 16, 36 messages or the like on the illuminated area (FIGS. 1A and 3A, respectively). In such a case, the advertisement 16, 36 or the like attached to the mounting bracket 15, 35 functions as the reflective surface providing indirect lighting to the passenger cabin. At the same time, the advertisement or, for instance a sign, is illuminated more powerfully than the environment thereof.

Figure 4:
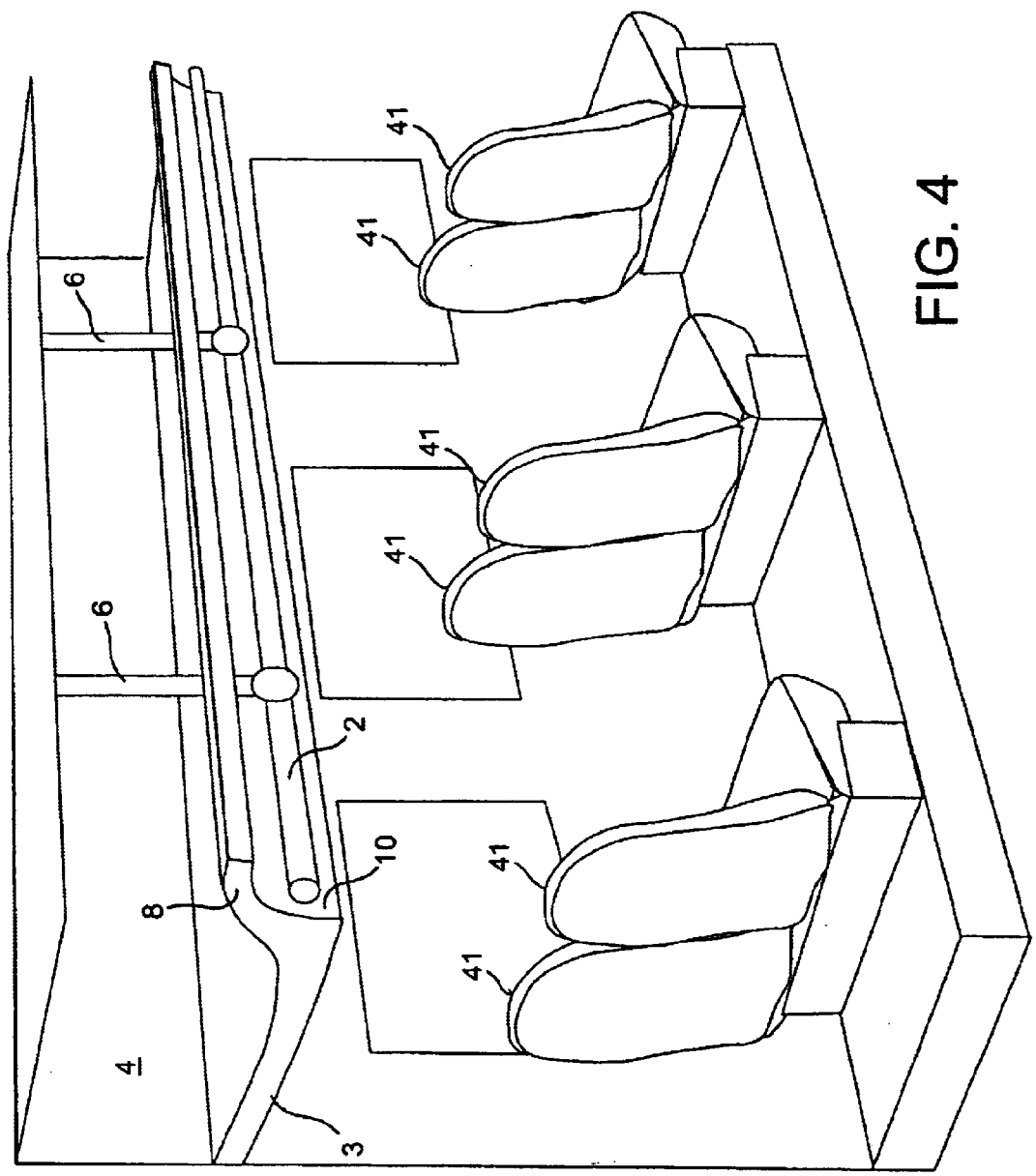
FIG. 4 shows how the arrangement of the invention can be positioned in a public transport vehicle.

FIG. 4 shows a part of the passenger cabin in the arrangement of the invention. As the Figure illustrates, the luggage rack is placed above the seats 41 in the passenger cabin. A handrail 2 is still placed in the vicinity of the open edge 8 of the luggage rack, and a light source is invisibly arranged inside the handrail 2. The end part of the open luggage rack is made concave as shown in FIG. 1 in order to provide Indirect lighting to the passenger cabin.

It is obvious for those skilled in the art that as technology advances the basic idea of the invention can be implemented in various ways. The invention and the embodiments thereof are therefore not restricted to the above examples but may vary within the scope of the claims.

What is claimed is:

1. A lighting arrangement for a public transport vehicle with a passenger cabin, wherein the passenger cabin comprises an upper structure located above one or more passenger seats, the upper structure comprising:
   at least one handrail, the handrail including at least one light permeable aperture;
   a light source arranged inside the handrail;
   a reflective surface disposed to reflect light emitted from the light source to the passenger cabin; and
   the aperture being arranged to direct light generated from the light source to the upper structure of the passenger cabin in the public transport vehicle, the upper structure being arranged to function as the reflective surface for providing the passenger cabin with indirect lighting.

2. The lighting arrangement as claimed in claim 1, wherein the upper structure of the passenger cabin further comprises a luggage rack including an open edge, wherein the handrail is arranged in the vicinity of the open edge of the luggage rack substantially below an end of the open edge, the reflective surface comprising a lower surface of the open edge of the luggage rack whereby indirect lighting is provided to the passenger cabin.

3. The lighting arrangement as claimed in claim 2, wherein the lower surface of the open edge of the luggage rack is concave.

4. The lighting arrangement as claimed in claim 2, wherein the handrail aperture is arranged such that the light source inside the handrail emits light outside the handrail substantially upwards from a horizontal plane.

5. The lighting arrangement as claimed in claim 2, wherein the handrail aperture is arranged such that the light source inside the handrail emits light outside the handrail substantially at a 90 degree angle.

6. The lighting arrangement as claimed in claim 2, wherein the reflective surface forms an illuminated area, light from the light source arranged inside the handrail falling on the illuminated area, the lighting arrangement further comprising a mounting bracket disposed to mount advertisements or messages along the illuminated area.

7. The lighting arrangement as claimed in claim 1, wherein the handrail aperture is arranged such that the light source inside the handrail emits light outside the handrail substantially upwards from a horizontal plane.

8. The lighting arrangement as claimed in claim 1, wherein the handrail aperture is arranged such that the light source inside the handrail emits light outside the handrail substantially at a 90 degree angle.

9. The lighting arrangement as claimed in claim 1, wherein the reflective surface forms an illuminated area, light from the light source arranged inside the handrail falling on the illuminated area, the lighting arrangement further comprising a mounting bracket disposed to mount advertisements or messages along the illuminated area.

10. The lighting arrangement as claimed in claim 1, wherein the light source is a fluorescent lamp.

11. A lighting arrangement for a public transport vehicle with a passenger cabin, wherein the passenger cabin comprises an upper structure located above one or more passenger seats, the upper structure comprising:
    at least one handrail, the handrail including at least one light permeable aperture;
    a light source arranged inside the handrail;
    a reflective surface disposed to reflect light emitted from the light source to the passenger cabin;
    the aperture being arranged to direct light generated from the light source to the upper structure of the passenger cabin in the public transport vehicle, the upper structure being arranged to function as the reflective surface for providing the passenger cabin with indirect lighting, and
    wherein the upper structure of the passenger cabin flirter comprises a part of a wall in the passenger cabin, the handrail being arranged close to the wall in the passenger cabin, the reflective surface comprising the part of the passenger cabin wall whereby indirect lighting is provided to the passenger cabin.

12. The lighting arrangement as claimed in claim 3, wherein the reflective surface forms an illuminated area, light from the light source arranged inside the handrail falling on the illuminated area, the lighting arrangement further comprising a mounting bracket disposed to mount advertisements or messages along the illuminated area.

13. A lighting arrangement for a public transport vehicle with a passenger cabin, wherein the passenger cabin comprises an upper structure located above one or more passenger seats, the upper structure comprising:
    at least one handrail, the handrail including at least one light permeable aperture;
    a light source arranged inside the handrail;
    a reflective surface disposed to reflect light emitted from the light source to the passenger cabin;
    the aperture being arranged to direct light generated from the light source to the upper structure of the passenger cabin in the public transport vehicle, the upper structure being arranged to function as the reflective surface for providing the passenger cabin with indirect lighting,
    wherein the upper structure of the passenger cabin further comprises a luggage rack including an open edge, wherein the handrail is arranged in the vicinity of the open edge of the luggage rack substantially below an end of the open edge, the reflective surface comprising a lower surface of the open edge of the luggage rack whereby indirect lighting is provided to the passenger cabin, and
    wherein the lower surface of the open edge of the luggage rack is convex.

14. A lighting arrangement for a public transport vehicle with a passenger cabin, wherein the passenger cabin comprises an upper structure located above one or more passenger seats, the upper structure comprising:
    at least one handrail, the handrail including at least one light permeable aperture;
    a light source arranged inside the handrail;
    a reflective surface disposed to reflect light emitted from the light source to the passenger cabin;
    the aperture being arranged to direct light generated from the light source to the upper structure of the passenger cabin in the public transport vehicle, the upper structure being arranged to function as the reflective surface for providing the passenger cabin with indirect lighting, and
    wherein at least one of the handrail apertures is adjustable.

15. A lighting arrangement for a public transport vehicle with a passenger cabin, wherein the passenger cabin comprises an upper structure located above one or more passenger seats, the upper structure comprising:
    at least one handrail, the handrail including at least one light permeable aperture;
    a light source arranged inside the handrail;
    a reflective surface disposed to reflect light emitted from the light source to the passenger cabin;
    the aperture being arranged to direct light generated from the light source to the upper structure of the passenger cabin in the public transport vehicle, the upper structure being arranged to function as the reflective surface for providing the passenger cabin with indirect lighting, wherein the upper structure of the passenger cabin further comprises a luggage rack including an open edge, wherein the handrail is arranged in the vicinity of the open edge of the luggage rack substantially below an end of the open edge, the reflective surface comprising a lower surface of the open edge of the luggage rack whereby indirect lighting is provided to the passenger cabin, and wherein at least one of the handrail apertures is adjustable.

16. A lighting arrangement for a public transport vehicle with a passenger cabin, wherein the passenger cabin comprises an upper structure located above one or more passenger seats, the upper structure comprising:

at least one handrail, the handrail including at least one light permeable aperture;

a light source arranged inside the handrail;

a reflective surface disposed to reflect light emitted from the light source to the passenger cabin;

the aperture being arranged to direct light generated from the light source to the upper structure of the passenger cabin in the public transport vehicle, the upper structure being arranged to function as the reflective surface for providing the passenger cabin with indirect lighting, wherein the upper structure of the passenger cabin further comprises a part of a wall in the passenger cabin, the handrail being arranged close to the wall in the passenger, cabin, the reflective surface comprising the part of the passenger cabin wall whereby indirect lighting is provided to the passenger cabin, and wherein the handrail aperture is arranged such that the light source inside the handrail emits light outside the handrail substantially upwards from a horizontal plane.

17. A lighting arrangement for a public transport vehicle with a passenger cabin, wherein the passenger cabin comprises an upper structure located above one or more passenger seats, the upper structure comprising:

at least one handrail, the handrail including at least one light permeable aperture;

a light source arranged inside the handrail;

a reflective surface disposed to reflect light emitted from the light source to the passenger cabin;

the aperture being arranged to direct light generated from the light source to the upper structure of the passenger cabin in the public transport vehicle, the upper structure being arranged to function as the reflective surface for providing the passenger cabin with indirect lighting, wherein the upper structure of the passenger cabin further comprises a part of a wall in the passenger cabin, the handrail being arranged close to the wall in the passenger cabin, the reflective surface comprising the part of the passenger cabin wall whereby indirect lighting is provided to the passenger cabin, and wherein the handrail aperture is arranged such that the light source inside the handrail emits light outside the handrail substantially at along a 90 degree angle.

18. A lighting arrangement for a public transport vehicle with a passenger cabin, wherein the passenger cabin comprises an upper structure located above one or more passenger seats, the upper structure comprising:

at least one handrail, the handrail including at least one light permeable aperture;

a light source arranged inside the handrail;

a reflective surface disposed to reflect light emitted from the light source to the passenger cabin;

the aperture being arranged to direct light generated from the light source to the upper structure of the passenger cabin in the public transport vehicle, the upper structure being arranged to function as the reflective surface for providing the passenger cabin with indirect lighting, wherein the upper structure of the passenger cabin further comprises a part of a wall in the passenger cabin, the handrail being arranged close to the wall in the passenger cabin, the reflective surface comprising the part of the passenger cabin wall whereby indirect lighting is provided to the passenger cabin, and wherein at least one of the handrail apertures is adjustable.

* * * * *